J. J. McDERMOTT.
PASSENGER REGISTERING APPARATUS FOR CARS.
APPLICATION FILED NOV. 16, 1907.

916,359.

Patented Mar. 23, 1909.
2 SHEETS—SHEET 1.

Inventor
James J. McDermott.

Witnesses
Phil E. Barnes
R. M. Smith

By Victor J. Evans
Attorney

J. J. McDERMOTT.
PASSENGER REGISTERING APPARATUS FOR CARS.
APPLICATION FILED NOV. 16, 1907.

916,359.

Patented Mar. 23, 1909.
2 SHEETS—SHEET 2.

Witnesses
Phil E. Barnes
P. M. Smith

Inventor
James J. McDermott.
By Victor J. Evans
Attorney

UNITED STATES PATENT OFFICE.

JAMES J. McDERMOTT, OF CLIFTON HEIGHTS, PENNSYLVANIA.

PASSENGER-REGISTERING APPARATUS FOR CARS.

No. 916,359.   Specification of Letters Patent.   Patented March 23, 1909.

Application filed November 16, 1907. Serial No. 402,488.

*To all whom it may concern:*

Be it known that I, JAMES J. McDERMOTT, a citizen of the United States, residing at Clifton Heights, in the county of Delaware and State of Pennsylvania, have invented new and useful Improvements in Passenger-Registering Apparatus for Cars, of which the following is a specification.

My invention relates to passenger registering apparatus for cars, and it consists in the construction and arrangement of parts, as will be hereinafter described and particularly pointed out in the claim.

Figure 1:
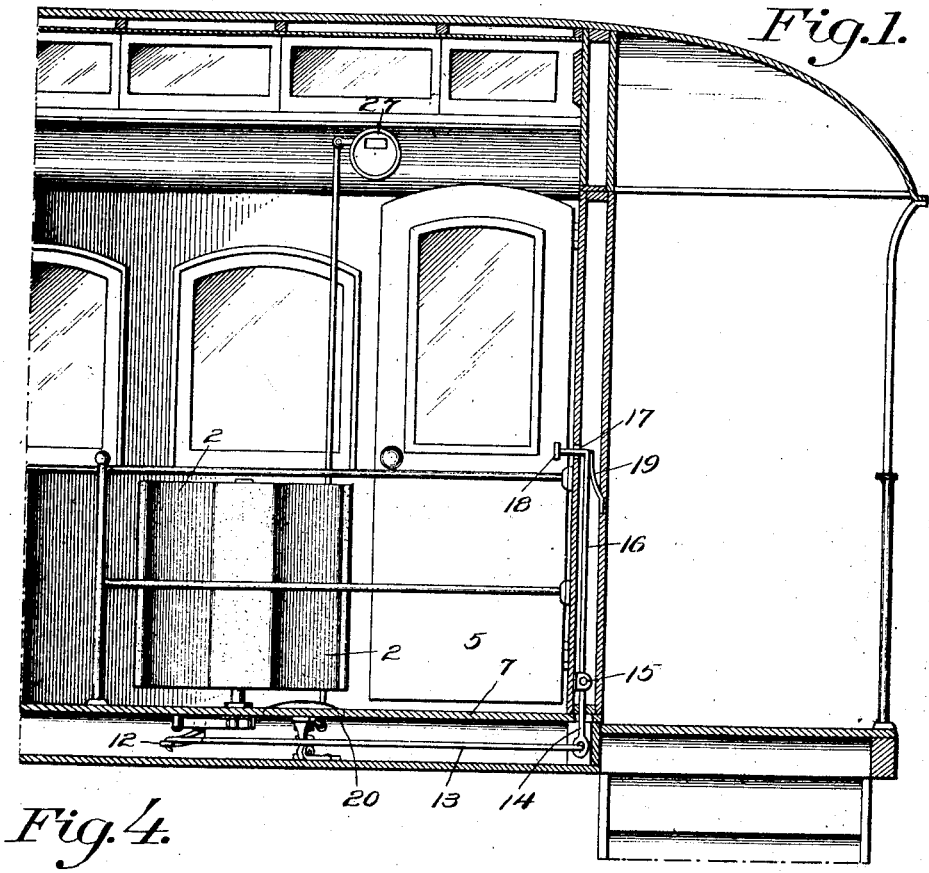
Figure 4:
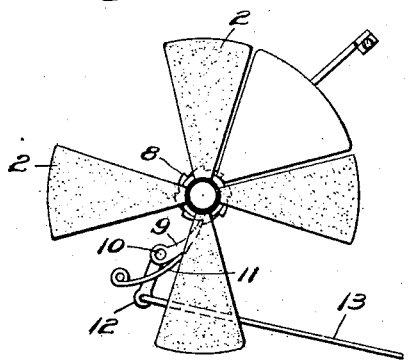
Figure 5:
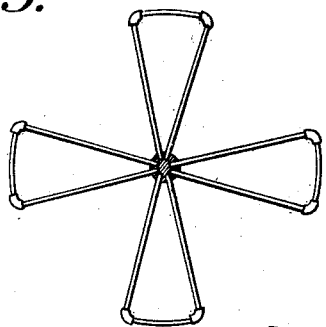
Figure 2:
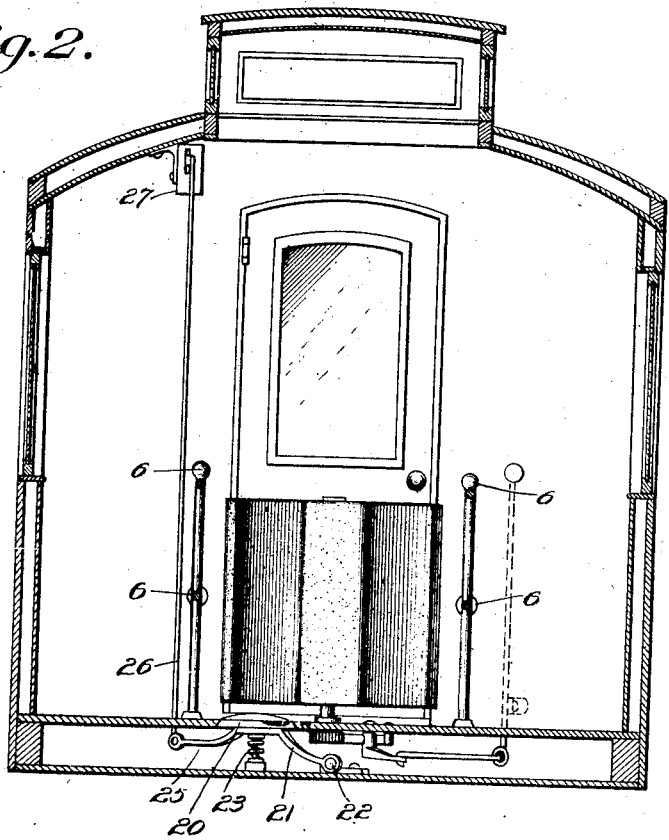
Figure 3:
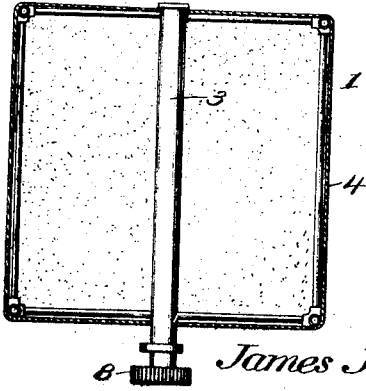

In the accompanying drawings:—Figure 1 is a vertical section through one end of a passenger car, showing the improved apparatus applied thereto. Fig. 2 is a vertical cross section through the same taken adjacent to the turn stile and looking toward the adjacent end of the car. Fig. 3 is a sectional view of the turn stile. Fig. 4 is a plan view of the same. Fig. 5 is a plan view of the frame of the turn stile.

The apparatus contemplated in this invention and which is applicable to any ordinary passenger car now in use without material alteration of the car itself, embodies a turn stile having a series of radiating arms 2 set at a suitable distance apart to leave ample space for a passenger to enter between the arms and proceed past the center post of the turn stile into the main body of the car where the seats are located.

While any preferred form of turn stile may be used, I have shown a simple, light and effective form of turn stile which as indicated in Fig. 1 comprises upper and lower sets of arms composed of rods of tubing made up of suitable sections and connected by unions as clearly shown in Fig. 5. The upper and lower sets of said arms are connected to a common center turn post 3 and the arms are then incased in a suitable cover 4 preferably of textile material as indicated in Figs. 3 and 4.

The turn stile above referred to is arranged in the aisle of the car and as close as practical to the entrance door leaving just sufficient room for the car door shown at 5 to be opened and closed. On opposite sides of the turn stile are arranged guard rails 6, the same being set close to the sweep of the turn stile so as to force each passenger to partially revolve the turn stile in the act of passing by the same.

The turn stile is allowed to revolve in one direction only. This is accomplished by extending the post 3 beneath the car 7 and providing the lower end thereof with a ratchet wheel 8 which is engaged by a pawl 9 pivotally mounted at 10 and held in engagement with the ratchet wheel 8 by means of a backing spring 11. The pawl 9 is further provided with an arm 12 to which is attached a connection 13 which may consist of a rod wire or chain, the latter extending to and being connected with the lower arm 14 of a vertically disposed lever fulcrumed intermediate its ends at the point 15 at one end of the car, the upper arm 16 of said lever being bent and extending horizontally through an opening 17 in the end wall of the car and provided with a head or button 18 arranged within reach of the conductor.

19 designates a spring which bears against the arm 16 of the lever and holds the button inward, in which position of the parts, the pawl 9 lies in engagement with the ratchet wheel 8. The conductor, however, by pressing against the head or button 18, may, through the connections described, rock the arm 12 and move the pawl 9 out of engagement with the ratchet wheel 8 thereby allowing him to revolve the turn stile in the reverse direction in order that he may pass the same on the opposite side from the side used by the passengers on entering the car.

In the floor 7 and close up to and beneath the turn stile is a treadle 20 having a projecting arm 21 which is pivotally attached at 22 to the car body, the treadle being upheld in the position, illustrated in Figs. 1 and 2 by a supporting spring 23 located beneath the treadle and adapted to allow a limited downward movement of the treadle for a purpose which will appear. The treadle is provided with another arm 25 to the extremity of which is attached a suitable connection 26 which extends upward to the fare register 27 and is attached to an operative element of said fare register whereby when the treadle 20 is depressed, the register is operated and the fare rung up.

The treadle 20 is located to that side of the center post 3 upon which each passenger must pass in reaching a seat after entering the car. He is forced to step upon the treadle 20 with the result above stated. On leaving the car he must pass the turn stile on the other side and he is prevented from again depressing the treadle. The conductor, however, by pressing the button 18, may release the turn stile so that he may pass the same on the reverse side, thereby avoiding the ringing up of a fare. The conductor of a car provided with the improved apparatus will be compelled to collect each fare indicated on the register or else report the reason of his failure to the company.

I claim:—

A passenger registering apparatus for railway cars embodying in combination with a fare register having a rod connected therewith, a turn stile the post of which is provided with a ratchet wheel located beneath the car floor, a spring actuated pivoted pawl for engaging the ratchet wheel, said pawl having an arm therewith having one end of a rod connected thereto, a vertical spring actuated lever inclosed by the car body and fulcrumed at one portion of its length and having its lower end inserted through the bottom of the car and connected to the outer end of said rod, said lever adapted to release the pawl from the ratchet wheel, a spring actuated treadle arranged beneath the turn stile and having a plurality of arms secured thereto and extending outwardly therefrom, the outer end of one arm is pivotally attached to the car body, the outer end of the outer arm being attached to the fare register rod, substantially as specified.

In testimony whereof I affix my signature in presence of two witnesses.

JAMES J. McDERMOTT.

Witnesses:
FRANK B. RHODES,
J. ROHRMAN ROBINSON.